(12) United States Patent
Takehara

(10) Patent No.: US 11,375,216 B2
(45) Date of Patent: Jun. 28, 2022

(54) TRANSCODING APPARATUS, TRANSCODING METHOD, AND TRANSCODING PROGRAM

(71) Applicant: JVCKENWOOD Corporation, Kanagawa (JP)

(72) Inventor: Hideki Takehara, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/817,664

(22) Filed: Mar. 13, 2020

(65) Prior Publication Data

US 2020/0213602 A1 Jul. 2, 2020

Related U.S. Application Data

(63) Continuation of application No. PCT/JP2018/014547, filed on Apr. 5, 2018.

(30) Foreign Application Priority Data

Sep. 13, 2017 (JP) .............................. JP2017-175700

(51) Int. Cl.
*H04N 19/40* (2014.01)
*H04N 19/96* (2014.01)
*H04N 19/119* (2014.01)
*H04N 19/146* (2014.01)
*H04N 19/159* (2014.01)
*H04N 19/176* (2014.01)

(52) U.S. Cl.
CPC ........... *H04N 19/40* (2014.11); *H04N 19/119* (2014.11); *H04N 19/146* (2014.11); *H04N 19/159* (2014.11); *H04N 19/176* (2014.11); *H04N 19/96* (2014.11)

(58) Field of Classification Search
None
See application file for complete search history.

(56) References Cited

U.S. PATENT DOCUMENTS

| 6,748,020 B1 * | 6/2004 | Eifrig | H04N 19/40 348/423.1 |
| 6,795,506 B1 * | 9/2004 | Zhang | H04L 29/06027 348/390.1 |
| 7,236,526 B1 * | 6/2007 | Kitamura | H04N 19/70 375/240.16 |

(Continued)

FOREIGN PATENT DOCUMENTS

| JP | 2000299856 A | 10/2000 |
| JP | 2003309851 A | 10/2003 |

(Continued)

OTHER PUBLICATIONS

International Search Report from International Application No. PCT/JP2018/014547 dated May 15, 2018, 4 pages.

*Primary Examiner* — Mohammad J Rahman
(74) *Attorney, Agent, or Firm* — Brundidge & Stanger, P.C.

(57) ABSTRACT

In a transcoding apparatus structured to transcode one bitstream to a plurality of bitstreams, a decoder decodes a first bitstream and outputs a first decoded picture. A first re-encoder re-encodes the first decoded picture on the basis of the first bitstream to generate a second bitstream having a smaller bit rate than the first bitstream.

7 Claims, 9 Drawing Sheets

(56) References Cited

U.S. PATENT DOCUMENTS

| | | | |
|---|---|---|---|
| 7,266,132 B1* | 9/2007 | Liu | H04N 21/23406 348/E5.008 |
| 7,356,079 B2* | 4/2008 | Laksono | H04N 19/176 375/240.03 |
| 7,738,550 B2* | 6/2010 | Kuhn | H04N 19/177 375/240.01 |
| 8,229,159 B2* | 7/2012 | Tourapis | H04N 19/107 382/100 |
| 8,352,992 B1* | 1/2013 | Patti | H04N 21/8586 725/105 |
| 8,374,344 B2* | 2/2013 | Van Der Vleuten | H04N 19/154 380/42 |
| 8,537,896 B2* | 9/2013 | Tanaka | H04N 19/57 375/240.16 |
| 8,767,838 B1* | 7/2014 | Xin | H04N 19/439 375/240.26 |
| 10,027,989 B2* | 7/2018 | Doshi | H04N 19/44 |
| 10,812,558 B1* | 10/2020 | Saxton | H04L 65/4069 |
| 10,863,184 B2* | 12/2020 | Kim | H04N 19/96 |
| 2003/0215018 A1* | 11/2003 | MacInnis | H04N 19/13 375/240.25 |
| 2004/0057521 A1* | 3/2004 | Brown | H04N 19/85 375/240.25 |
| 2005/0053153 A1* | 3/2005 | Moni | H04N 19/59 375/E7.198 |
| 2006/0133500 A1* | 6/2006 | Lee | H04N 19/56 375/240.16 |
| 2006/0133503 A1* | 6/2006 | Park | H04N 19/52 375/240.16 |
| 2007/0071096 A1* | 3/2007 | Chen | H04N 19/107 375/240.12 |
| 2007/0153916 A1* | 7/2007 | Demircin | H04N 21/23805 375/240.26 |
| 2012/0082220 A1* | 4/2012 | Mazurenko | H04N 19/40 375/240.12 |
| 2012/0179833 A1 | 7/2012 | Kenrick et al. | |
| 2012/0257672 A1* | 10/2012 | Yang | H04N 19/172 375/240.03 |
| 2012/0269258 A1* | 10/2012 | Yang | H04N 19/172 375/240.02 |
| 2013/0028321 A1* | 1/2013 | Sato | H04N 19/154 375/240.12 |
| 2013/0148741 A1* | 6/2013 | Steinberg | H04N 19/59 375/240.01 |
| 2013/0202028 A1* | 8/2013 | Xin | H04N 19/40 375/240.02 |
| 2014/0334532 A1* | 11/2014 | Pearson | H04N 19/40 375/240.02 |
| 2014/0355625 A1* | 12/2014 | Chen | H04L 65/4084 370/468 |
| 2015/0009403 A1* | 1/2015 | Li | H04N 19/40 348/441 |
| 2015/0058494 A1* | 2/2015 | Sharif-Ahmadi | H04N 21/25891 709/231 |
| 2015/0208074 A1* | 7/2015 | Takahashi | H04N 19/52 382/233 |
| 2015/0271491 A1* | 9/2015 | Wang | H04N 19/159 375/240.02 |
| 2015/0281746 A1* | 10/2015 | Lam | H04N 21/231 725/116 |
| 2017/0236546 A1* | 8/2017 | Wirick | H04N 19/59 386/328 |
| 2017/0302981 A1* | 10/2017 | Sethuraman | H04N 21/8456 |
| 2018/0270524 A1* | 9/2018 | Jones | H04N 9/8045 |
| 2018/0287906 A1* | 10/2018 | Clements | G06F 11/321 |
| 2019/0014360 A1* | 1/2019 | Jones | H04N 21/2408 |

FOREIGN PATENT DOCUMENTS

| | | |
|---|---|---|
| JP | 2004533748 A | 11/2004 |
| WO | 2010079797 A1 | 7/2010 |

* cited by examiner

TRANSCODING APPARATUS, TRANSCODING METHOD, AND TRANSCODING PROGRAM

BACKGROUND OF THE INVENTION

The present invention relates to a video coding data transcoding technology, and more particularly, to a video coding data transcoding apparatus, a video coding data transcoding method, and a video coding data transcoding program suitable for a case where transcoding is performed multiples times.

In recent years, a service that operates an adaptive streaming technology typified by MPEG Dynamic Adaptive Streaming over HTTP (MPEG-DASH) on the cloud has become actively used.

In the adaptive streaming technology, video coding data items of a plurality of bit rates are previously prepared on the cloud so that the video coding data items can be switched at a predetermined period. Thus, a user can select an optimal bit rate in the unit of the predetermined period according to a dynamic change of a viewing environment, for example, a viewing condition affected by bit rate, and view a video coding data item corresponding to the selected bit rate by streaming.

However, in the adaptive streaming technology, it is necessary to prepare video coding data items of a plurality of bit rates with respect to one video data item. Thus, there is a problem in that cost required to generate a plurality of video coding data items increases.

Further, High Efficiency Video Coding (HEVC), which is the latest video coding technology, can be adaptively used in an inter prediction size from 4×8 pixel to 64×64 pixel. Thus, there is a problem in that cost required to generate video coding data items further increases.

Transcoding that decodes a first bitstream to encode the first stream to a second bitstream is known as a technology that generates video coding data items of a plurality of bit rates with respect to one video data item.

For example, JP 2003-309851 A describes a technology that reduces the processing amount by transcoding the first bitstream to the second bitstream using a motion vector of a block of the first bitstream. JP 2004-533748 A describes a configuration that improves the processing efficiency of multiple times of transcoding using part of the first bitstream.

In the technology described in JP 2003-309851 A, a decoded picture is used as an input picture. Thus, there is a problem in that the picture quality is reduced when re-encoding is repeatedly performed. In the technology described in JP 2004-533748 A, transcoding is performed multiple times using part of the first bitstream at all bit rates. Thus, there is a problem in that the coding efficiency is reduced.

SUMMARY OF THE INVENTION

The present invention has been made in view of the above circumstances, and an object thereof is to provide a transcoding technology having high processing efficiency, the transcoding technology being capable of preventing a reduction in the coding efficiency while preventing a reduction in the picture quality.

In order to solve the above problems, a transcoding apparatus according to one embodiment of the present invention is a transcoding apparatus structured to transcode one bitstream to a plurality of bitstreams, the transcoding apparatus including: a decoder structured to decode a first bitstream and output a first decoded picture; and a first re-encoder structured to re-encode the first decoded picture on the basis of the first bitstream to generate a second bitstream having a smaller bit rate than the first bitstream.

Another embodiment of the present invention is a transcoding method. The method is a transcoding method for transcoding one bitstream to a plurality of bitstreams, the method including: a decoding step of decoding a first bitstream and outputting a first decoded picture; and a first re-encoding step of re-encoding the first decoded picture on the basis of the first bitstream to generate a second bitstream having a smaller bit rate than the first bitstream.

It should be noted that any combinations of the above components and conversions of expressions of the present invention between a method, an apparatus, a system, a recoding medium, a computer program, and the like are also effective as modes of the present invention.

DETAILED DESCRIPTION OF THE PREFERRED EMBODIMENT

Figure 1:
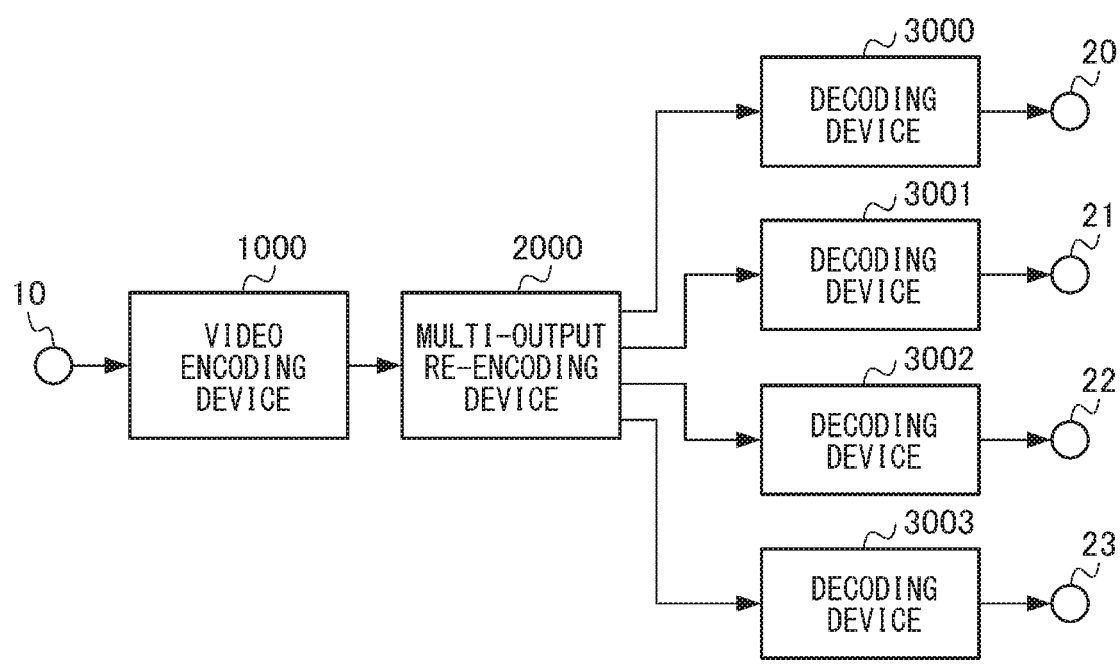
FIG. 1 is a diagram describing a transcoding system according to a first embodiment.

The invention will now be described by reference to the preferred embodiments. This does not intend to limit the scope of the present invention, but to exemplify the invention.

First Embodiment

Hereinbelow, a transcoding apparatus, a transcoding method, and a transcoding program according to a preferred embodiment of the present invention will be described in detail with reference to the drawings. Note that identical elements are designated by identical reference numerals throughout the drawings to omit redundant description.

FIG. 1 is a diagram describing a transcoding system according to a first embodiment. The transcoding system according to the first embodiment includes a video encoding device 1000, a multi-output re-encoding device 2000, and decoding devices 3000, 3001, 3002, 3003. The video encoding device 1000 is, for example, a CPU, a RAM, a ROM, or a device including the CPU, the RAM, and the ROM in cooperation with each other. The video encoding device 1000 is installed, for example, in a computer. The multi-output re-encoding device 2000 is, for example, a CPU, a RAM, a ROM, or a device including the CPU, the RAM, and the ROM in cooperation with each other. The multi-output re-encoding device 2000 is installed, for example, in a cloud server. The video encoding device 1000 and the decoding devices 3000, 3001, 3002, 3003 are coupled to the multi-output re-encoding device 2000 via a network. Although, in the present embodiment, the multi-output re-encoding device 2000 is installed in the cloud server, the multi-output re-encoding device 2000 may be installed inside a device such as a gateway. The video encoding device 1000 and the decoding devices 3000, 3001, 3002, 3003 may have any modes as long as the video encoding device 1000 and the decoding devices 3000, 3001, 3002, 3003 are coupled to the multi-output re-encoding device 2000 via a network.

The video encoding device 1000 encodes video data input from a terminal 10 by, for example, HEVC, and outputs a bitstream A at a bit rate RA.

The multi-output re-encoding device 2000 transcodes the bitstream A input from the video encoding device 1000 to a multi-bit rate HEVC stream, and outputs the bitstream A, a bitstream B having a bit rate RB, a bitstream C having a bit rate RC, and a bitstream D having a bit rate RD.

The decoding device 3000 decodes the bitstream A input from the multi-output re-encoding device 2000, and outputs decoded video data A to a terminal 20.

The decoding device 3001 decodes the bitstream B input from the multi-output re-encoding device 2000, and outputs decoded video data B to a terminal 21.

The decoding device 3002 decodes the bitstream C input from the multi-output re-encoding device 2000, and outputs decoded video data C to a terminal 22.

The decoding device 3003 decodes the bitstream D input from the multi-output re-encoding device 2000, and outputs decoded video data D to a terminal 23.

The relationship between the bit rates (bps) RA, RB, RC, RD is represented by Formula 1.

$$RA>RB>RC>RD \quad \text{(Formula 1)}$$

In the present embodiment, the bitstream A, the bitstream B, the bitstream C, and the bitstream D are encoded with a picture size and the number of bits shown in Table 1. A combination of the picture size (pixel), a color difference format, a frame rate (fps), and the number of bits of each of the bitstream A, the bitstream B, the bitstream C, and the bitstream D is not limited to the combination shown in Table 1 as long as the picture size, the color difference format, the frame rate, and the number of bits of the bitstream in the higher order are larger than or equal to the color difference format, the frame rate, and the number of bits of the bitstream in the lower order, respectively.

TABLE 1

|  | Picture size | Color difference | Frame rate | Number of bits |
|---|---|---|---|---|
| Bitstream A | W × H | 4:2:0 | 30 | 10 bit |
| Bitstream B | W × H | 4:2:0 | 30 | 8 bit |
| Bitstream C | W/2 × H/2 | 4:2:0 | 30 | 8 bit |
| Bitstream D | W/4 × H/4 | 4:2:0 | 30 | 8 bit |

For example, a high-resolution video monitor is coupled to the terminal 20 to which the decoded video data A is output. A personal computer is coupled to the terminal 21 to which the decoded video data B is output. A tablet computer is coupled to the terminal 22 to which the decoded video data C is output. A smartphone is coupled to the terminal 23 to which the decoded video data D is output. That is, a video data processing capacity becomes lower in the order from the device coupled to the terminal 20.

In the above description, the decoding devices 3000 to 3003 are separate devices. However, a single device provided with functional blocks corresponding to the decoding devices 3000 to 3003 may be provided. In this case, the single decoding device selects and decodes a bitstream having an appropriate bitrate from the bitstreams A to D according to the degree of congestion of the network and a processor activity ratio. Further, the single decoding device may be provided with a decoding block for 10 bits and a decoding block for 8 bits, and the decoding block for 10 bits may decode the 10-bit bitstream A and the decoding block for 8 bits may decode the 8-bit bitstreams B to D.

Figure 2:
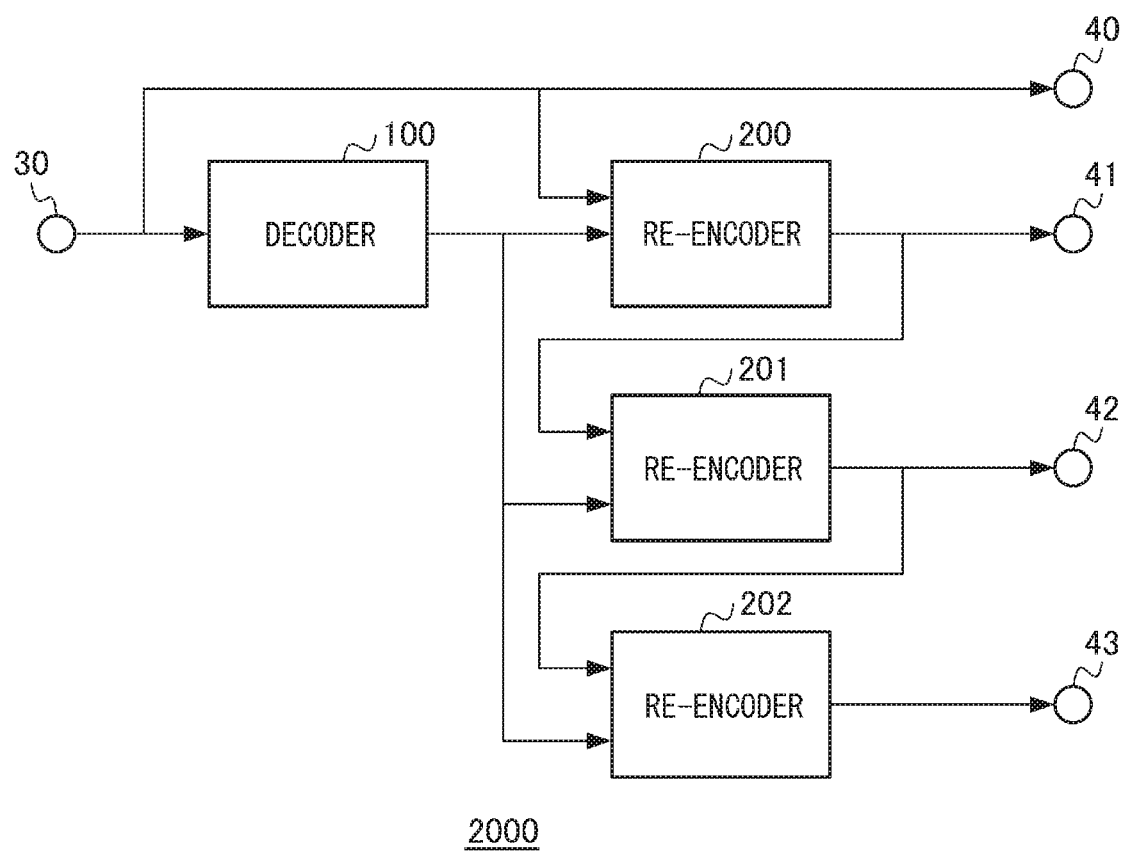
FIG. 2 is a diagram describing the configuration of a multi-output re-encoding device of FIG. 1.

FIG. 2 is a diagram describing the configuration of the multi-output re-encoding device 2000. The multi-output re-encoding device 2000 includes a decoder 100, a re-encoder 200, a re-encoder 201, and a re-encoder 202.

An outline of the operation of the multi-output re-encoding device 2000 will be described with reference to FIG. 2. In the present embodiment, the multi-output re-encoding device 2000 processes the bitstream A input from a terminal 30 in the unit of access unit. However, the multi-output re-encoding device 2000 processes the bitstream A in the unit of a plurality of access units or GOP. Further, a delay can be reduced by processing the bitstream A in the unit of slice or coding tree unit (CTU) which is a smaller unit than the access unit.

The bitstream A having the bit rate RA input from the terminal 30 is output to a terminal 40.

The decoder 100 decodes the bitstream A input from the terminal 30, and outputs a decoded picture.

The re-encoder 200 re-encodes the decoded picture input from the decoder 100 on the basis of the bitstream A input from the terminal 30 to generate the bitstream B having the bit rate RB, and outputs the bitstream B to a terminal 41.

The re-encoder 201 re-encodes the decoded picture input from the decoder 100 on the basis of the bitstream B input from the re-encoder 200 to generate the bitstream C having the bit rate RC, and outputs the bitstream C to a terminal 42.

The re-encoder 202 re-encodes the decoded picture input from the decoder 100 on the basis of the bitstream C input from the re-encoder 201 to generate the bitstream D having the bit rate RD, and outputs the bitstream D to a terminal 43.

When the re-encoders 200, 201, 202 re-encode the decoded picture to generate the bitstreams B, C, D, respectively in this manner, the encoding is performed on the basis of information of the bitstream A, B, or C in a one-rank higher order having close coding conditions. Thus, a reduction in the coding efficiency can be prevented. Further, the re-encoders 200, 201, 202 re-encode the decoded picture, which is obtained by decoding the bitstream A having the highest quality. Thus, a reduction in the picture quality can be prevented.

In the above description, the re-encoders 200, 201, 202 are separate blocks. However, the re-encoders 200, 201, 202 may be configured as a single block. In this case, the single re-encoder may re-encode the decoded picture on the basis of the bitstream A to generate the bitstream B, then re-encode the decoded picture on the basis of the bitstream B to generate the bitstream C, and further re-encode the decoded picture on the basis of the bitstream C to generate the bitstream D.

Figure 3:
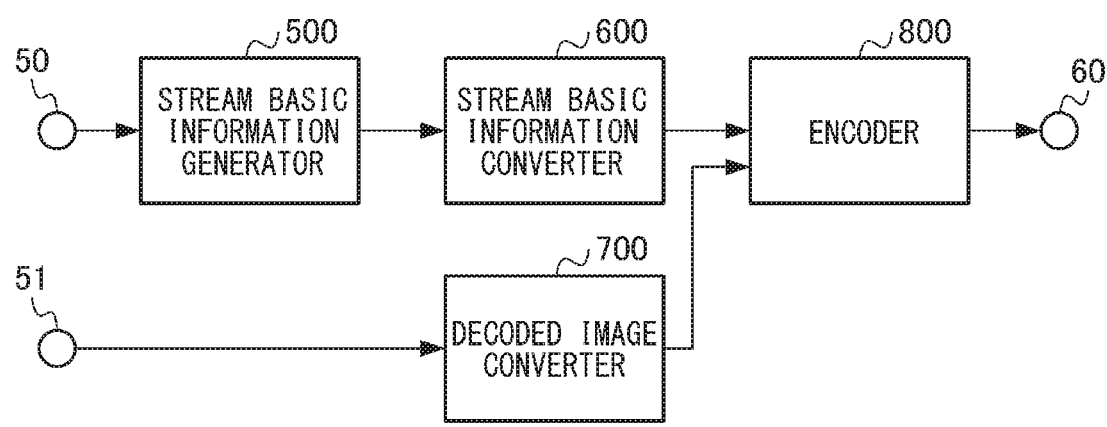
FIG. 3 is a diagram describing the configuration of re-encoders of FIG. 2.

FIG. 3 is a diagram describing the configuration of the re-encoders 200, 201, 202. Each of the re-encoders 200, 201, 202 includes a stream basic information generator 500, a stream basic information converter 600, a decoded picture converter 700, and an encoder 800. The re-encoder 200, the re-encoder 201, and the re-encoder 202 have the same configuration.

An outline of the operation of the re-encoders 200, 201, 202 will be described with reference to FIG. 3.

The stream basic information generator 500 generates stream basic information SN from a bitstream N input from a terminal 50, and outputs the stream basic information SN. Note that N=A, B, or C. In the case of the re-encoder 200, the stream basic information generator 500 generates stream basic information SA from the bitstream A. In the case of the re-encoder 201, the stream basic information generator 500 generates stream basic information SB from the bitstream B. In the case of the re-encoder 202, the stream basic information generator 500 generates stream basic information SC from the bitstream C.

The stream basic information SN will be described. The stream basic information SN is information obtained by decoding the bitstream N. In the present embodiment, the stream basic information SN includes a coding block size (coding unit (CU) size), a prediction block size (prediction unit (PU) size), and prediction information. The prediction information includes an intra prediction mode, a motion vector, and reference picture information referenced by the motion vector. The PU size is determined by a partition mode which indicates a partition pattern of the prediction block (PU) inside the coding block (CU). The coding block size indicates the size of blocks when a coding tree unit is repeatedly partitioned. Further, the prediction block size indicates the size of blocks into which the coding block is partitioned when prediction is performed. Further, the coding tree unit indicates the unit of partitioning a picture.

The stream basic information converter 600 converts the stream basic information SN of the bitstream N input from the stream basic information generator 500 to stream basic information SM of a bitstream M, and outputs the stream basic information SM. Note that M=B, C, or D. In the case of the re-encoder 200, the stream basic information converter 600 converts the stream basic information SA to the stream basic information SB. In the case of the re-encoder 201, the stream basic information converter 600 converts the stream basic information SB to the stream basic information SC. In the case of the re-encoder 202, the stream basic information converter 600 converts the stream basic information SC to a stream basic information SD. Details the conversion of the stream basic information will be described later.

The decoded picture converter 700 converts a decoded picture IA input from a terminal 51 conforming to the combination of the picture size, the color difference format, and the number of bits of the bitstream M shown in Table 1 with reference to a memory (not illustrated) in which various coding conditions of the bitstream M shown in Table 1 are stored, and outputs a decoded picture IM. For example, the re-encoder 200 outputs the bitstream B. Thus, the re-encoder 200 outputs the decoded picture IM which is obtained by converting the decoded picture IA input to the re-encoder 200 conforming to the picture size: W×H pixel, the color difference format: 4:2:0, the frame rate: 30 fps, and the number of bits: 8 bits of the bitstream B in Table 1.

The encoder 800 encodes the decoded picture IM input from the decoded picture converter 700 on the basis of the stream basic information SM input from the stream basic information converter 600, and outputs the bitstream M to a terminal 60. Since the encoder 800 encodes the decoded picture IM on the basis of the stream basic information SM of the bitstream M, it is possible to reduce processing relating to determination of the CU size, determination of the partition mode, determination of the intra prediction mode, and determination of the motion vector and the reference picture information referenced by the motion vector, the processing being relatively heavy in the processing amount of the coding.

The re-encoders 200, 201, 202 can minimize deterioration in the picture quality by using, as an input picture, the decoded picture of the bitstream A having the smallest picture quality deterioration caused by coding among the decoded pictures. Further, the re-encoders 200, 201, 202 can minimize a reduction in the coding efficiency by using, as the stream basic information, stream basic information of a coded bitstream having the closest picture size, color difference format, and number of bits. Typically, there is a correlation between the bit rate, the picture size, the color difference format, and the number of bits. Thus, the re-encoders 200, 201, 202 can also use, as the stream basic information, stream basic information of a coded bitstream having the closest bit rate.

Figure 4:
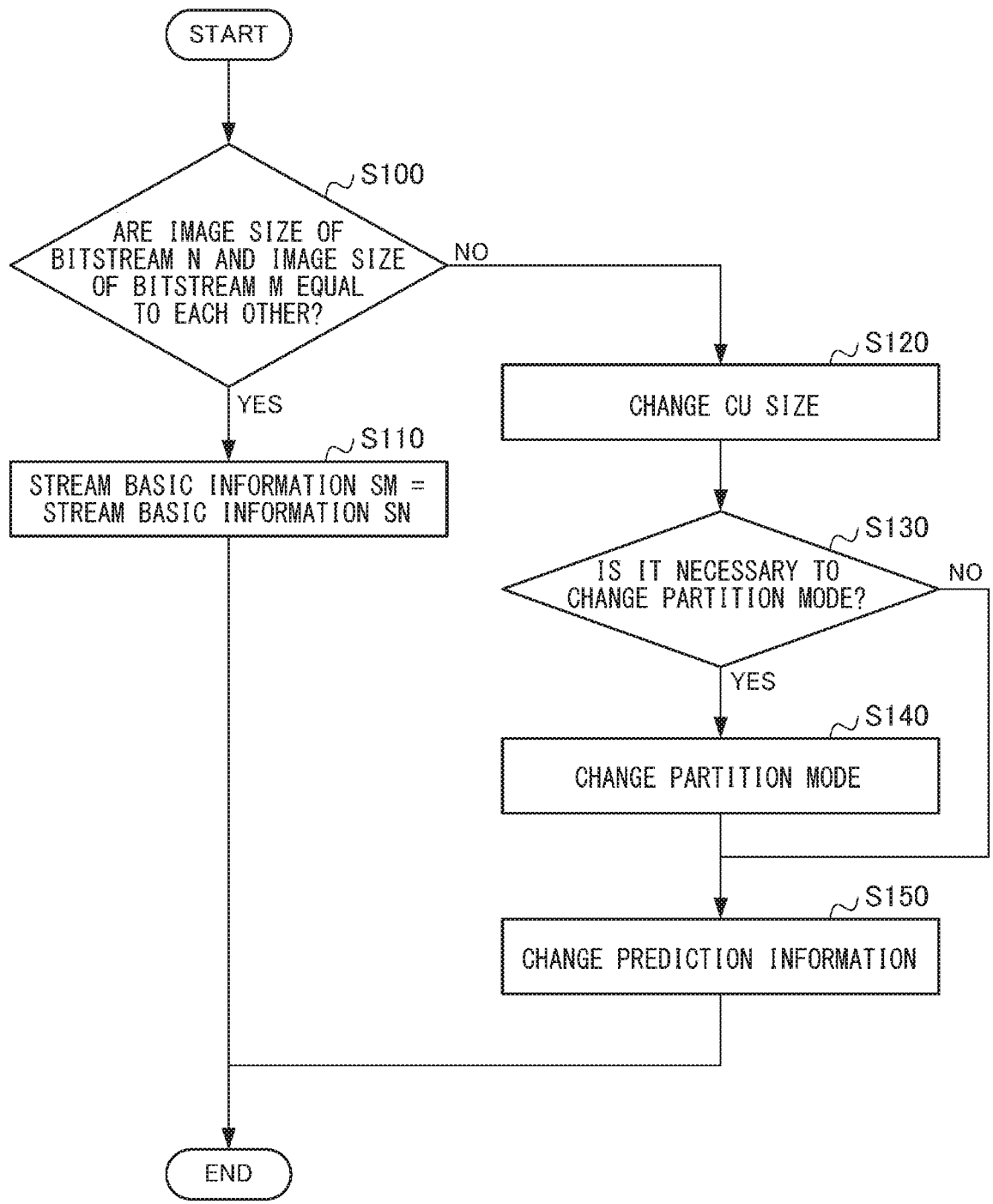
FIG. 4 is a flowchart describing a stream basic information conversion process.

FIG. 4 is a flowchart describing a stream basic information conversion process. Hereinbelow, the operation of the stream basic information conversion will be described with reference to FIG. 4.

First, it is checked whether the picture size of the bitstream N and the picture size of the bitstream M are equal to each other (S100).

When the picture size of the bitstream N and the picture size of the bitstream M are equal to each other (YES in S100), it is determined that the stream basic information SM of the bitstream M is the same as the stream basic information SN of the bitstream N (S110), and the process is finished. When the picture size of the bitstream N and the picture size of the bitstream M are not equal to each other (NO in S100), the CU size is changed (S120). Next, it is checked whether it is necessary to change the partition mode (S130). When it is not necessary to change the partition mode (NO in S130), the process proceeds to step S150. When it is necessary to change the partition mode (YES in S130), the partition mode is changed (S140). Next, prediction information is changed (S150), and the process is finished.

Figure 5:
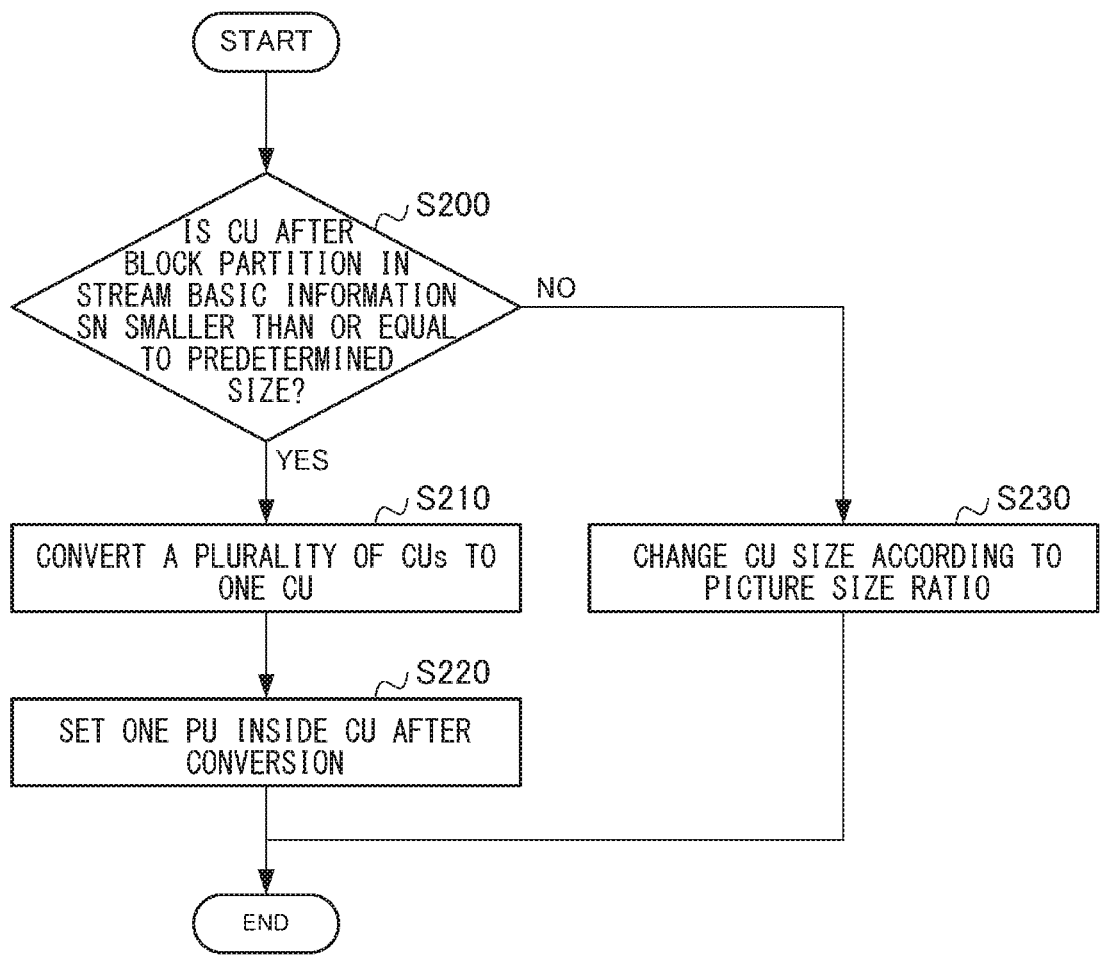
FIG. 5 is a flowchart describing a CU size change process.

FIG. 5 is a flowchart describing the CU size change process in step S120. Hereinbelow, the change of the CU size will be described with reference to FIG. 5.

First, it is checked whether each CU size after block partition in the stream basic information SN is smaller than or equal to a predetermined size (S200). When each CU size after block partition in the stream basic information SN is smaller than or equal to the predetermined size (YES in S200), a plurality of CUs continuous, in the order of coding, with a CU having the CU size smaller than or equal to the predetermined size in the stream basic information SN are converted to one CU in the stream basic information SM (S210). The partition mode is set so that the CU of the stream basic information SM includes one PU (S220). When each CU size after block partition in the stream basic information SN is not smaller than or equal to the predetermined size (NO in S200), the CU size of the stream basic information SN is changed to the CU size of the stream basic information SM according to the ratio between the picture size of the bitstream N and the picture size of the bitstream M (S230).

Figure 6A:
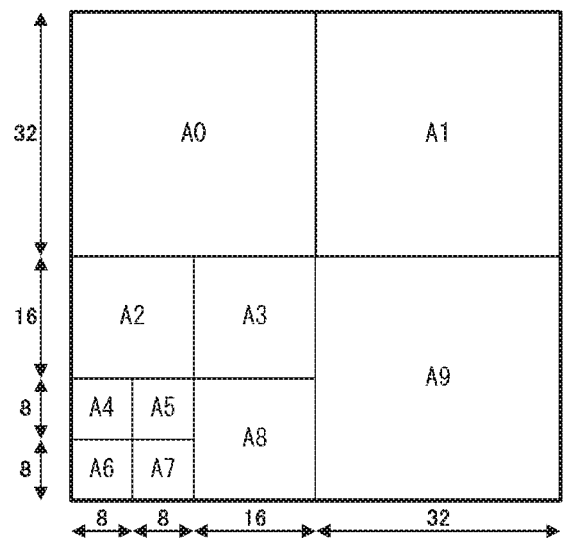
FIG. 6A illustrates a CU partition example of a certain coding quad tree CQT included in stream basic information SN.

An example of the conversion of the stream basic information with the change of the CU size in the re-encoder 210 will be described. FIG. 6A is a CU partition example of a coding quad tree (CQT) included in the stream basic information SN. FIG. 6B is a CU partition example of a CQT of the stream basic information SM converted from the CQT of FIG. 6A. Hereinbelow, description will be made with reference to FIG. 6A and FIG. 6B.

The re-encoder 210 decodes the bitstream B in which the picture size is W×H, the color difference format is 420, and the number of bits is 8 bits to generate the bitstream C in which the picture size is W/2×H/2, the color difference format is 420, and the number of bits is 8 bits. Hereinbelow, description will be made assuming that the maximum CU size of the bitstream B is 32×32, and the minimum CU size of the bitstream B is 8×8.

The CU size of the stream basic information SB is changed to the CU size of the stream basic information SC according to the ratio between the picture size of the bitstream B and the picture size of the bitstream C. In this example, the ratio between the picture size of the bitstream B and the picture size of the bitstream C is 2:1. Thus, the CU size of the stream basic information SB is changed to a ½ size in each of the horizontal direction and the vertical direction as the CU size of the stream basic information SC. For example, a CU (A0) having a CU size of 32×32 is changed to a CU (B0) having a CU size of 16×16. The CQT is changed from 32×32 in the stream basic information SB to 16×16 in the stream basic information SC.

The size of a CU (A4), a CU (A5), a CU (A6), and a CU (A7) is 8×8, which is the minimum CU size of HEVC. Thus, when the size is changed to a ½ size in each of the horizontal direction and the vertical direction, the size becomes 4×4, which is a CU size which does not exist in HEVC. Thus, when each CU size after block partition in the stream basic information SB is smaller than or equal to the predetermined size (8×8 in this example), a plurality of CUs continuous, in the order of coding, with a CU having the CU size smaller than or equal to the predetermined size in the stream basic information SB are converted to one CU in the stream basic information SC. That is, the four CUs (A4), (A5), (A6), and (A7) are converted to one CU (B4). The bitstream C can be a bitstream conforming to HEVC by converting a plurality of CUs continuous, in the order of coding, with a CU having the CU size smaller than or equal to the predetermined size in the stream basic information SB to one CU in the stream basic information SC in this manner.

Next, the change of the partition mode in steps S130 and S140 will be described in detail.

Checking whether it is necessary to change the partition mode in step S130 corresponds to checking whether a combination of a plurality of PU sizes inside a certain CU of the stream basic information SN is a combination of predetermined sizes. Changing the partition mode in step S140 corresponds to changing the combination of a plurality of PUs of the stream basic information SN to a partition mode including one PU in the stream basic information SM.

In the present embodiment, the PU size of the stream basic information SM is determined by the partition mode. However, the PU size of the stream basic information SN may be converted to the PU size of the stream basic information SM so as to have a ratio equal to the ratio between the picture size of the bitstream N and the picture size of the bitstream M.

Figure 6C:
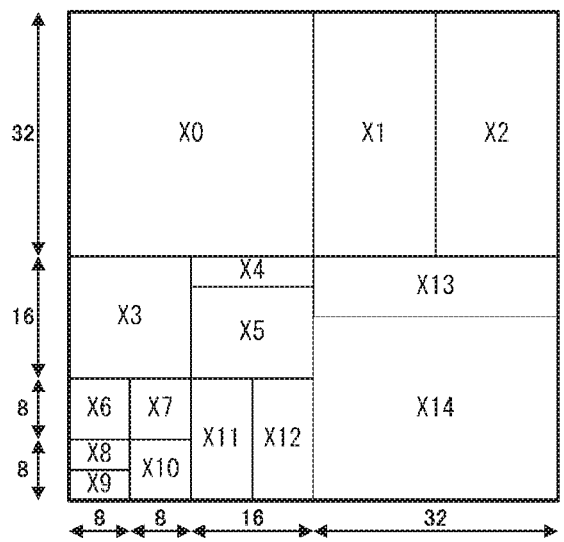
FIG. 6C illustrates an example in which CUs of the CQT of FIG. 6A are partitioned into PUs.
Figure 6B:
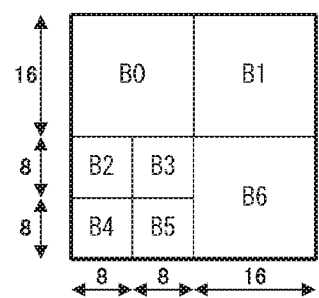
FIG. 6B is a diagram illustrating a CU partition example of a CQT converted from the CQT of FIG. 6A.
Figure 6D:
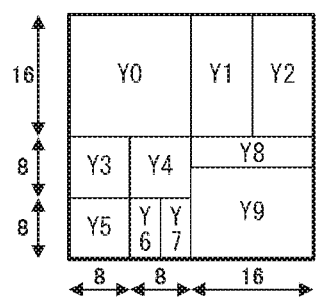
FIG. 6D is a diagram illustrating an example in which CUs of the CQT of FIG. 6B are partitioned into PUs.

FIG. 6C is an example in which the CUs of the CQT of FIG. 6A are partitioned into PUs. For example, the CU (A0) corresponds to a PU (X0), a CU (A1) corresponds a PU (X1) and a PU (X2), and the CU (A6) corresponds a PU (X8) and a PU (X9). FIG. 6D is an example in which CUs of the CQT of FIG. 6B obtained by converting the stream basic information into PUs. Hereinbelow, description will be made with reference to FIGS. 6C and 6D.

The PU size of the stream basic information SB is changed to the PU size of the stream basic information SC according to the ratio between the picture size of the bitstream B and the picture size of the bitstream C. In this example, the ratio between the picture size of the bitstream B and the picture size of the bitstream C is 2:1. Thus, the PU size of the stream basic information SB is changed to a ½ size in each of the horizontal direction and the vertical direction as the PU size of the stream basic information SC. For example, the PU (X0) having a PU size of 32×32 is changed to a PU (Y0) having a PU size of 16×16, and the PU (X1) having a PU size of 16×32 is changed to a PU (Y1) having a PU size of 8×16.

The size of a PU (X4) is 16×4, and the size of a PU (X5) is 16×12. Thus, when the size of the PU (X4) and the size of the PU (X5) are changed to a ½ size in each of the horizontal direction and the vertical direction, the size of the PU (X4) and the size of the PU (X5) respectively become 8×2 and 8×6, which are PU sizes which do not exist in HEVC. Thus, when the combination of a plurality of PU sizes inside the CU of the stream basic information SB is a combination of predetermined sizes (in this example, 16×4 and 16×12 or 4×16 and 12×16), the PUs inside the CU of the stream basic information SC are changed to one PU. That is, the two PUs (X4) and (X5) are changed to one PU (Y4). Note that "the combination of a plurality of PU sizes inside a CU is the combination of predetermined sizes" indicates, for example, a combination of a plurality of PU sizes inside a certain CU, the combination becoming out-of-specification when the sizes are changed or a combination of PU sizes which is within a specification, but cannot be dealt with by a decoder.

Further, when a plurality of CUs continuous in the order of coding in the same hierarchy in the stream basic information SB are converted to one CU in the stream basic information SC, PUs included in the CUs continuous in the order of coding in the same hierarchy in the stream basic information SB are converted to one PU in the stream basic information SC. Specifically, since four CUs (A4) to (A7) of the stream basic information SB are converted to one CU (B4) in the stream basic information SC, five PUs (X6) to (X10) of the stream basic information SB are converted to one PU (Y5) in the stream basic information SC. The bitstream C can be a bitstream conforming to HEVC by converting a plurality of PUs inside the CU of the stream basic information SB to one PU in the stream basic information SC in this manner.

In this example, when the combination of a plurality of PU sizes in the same hierarchy of the stream basic information SN is the combination of predetermined sizes, the PUs in the same hierarchy of the stream basic information SN are converted to one PU on the stream basic information SM. However, when a partition mode of a CU having a CU size smaller than or equal to a predetermined size in the stream basic information SN is a predetermined partition mode, a partition mode of the stream basic information SM can be changed to a partition mode which differs from the partition mode of the CU of the stream basic information SN and has the same partition direction. For example, taking into consideration that the PU (Y4) is based on a CU (A3) partitioned in the horizontal direction, the PU (Y4) can also be converted to two PUs each having a size of 8×4 as a partition mode capable of partition in the horizontal direction.

Further, when the number of PUs in the same hierarchy inside the CQT of the stream basic information SN is larger than or equal to a predetermined number, a partition mode which performs partition in the direction corresponding to a larger number of partitions of the PUs inside the CQT of the stream basic information SN can be set as the partition mode of the CUs of the stream basic information SM. For example, when the CUs (A4) to (A7) are partitioned into PUs, the CUs are partitioned into two in the horizontal direction and one in the vertical direction. Thus, the CUs are partitioned a larger number of times in the horizontal direction. Taking this into consideration, the PU (Y5) can also be converted to two PUs each having a size of 8×4 as a partition mode capable of partition in the horizontal direction.

Further, when the number of PUs in the same hierarchy inside the CQT of the stream basic information SN is larger than or equal to the predetermined number, there is a possibility that the efficiency of inter prediction is low. Thus, the CQT can also be configured to have an intra-mode CU. For example, the CQT including the CUs (A4) to (A7) includes the five PUs (X6) to (X10). Thus, the CU (B4) is set to an intra mode.

Similarly, when the number of intra-mode CUs included in the CQT of the stream basic information SN is larger than or equal to a predetermined number, there is a possibility that the efficiency of inter prediction is low. Thus, the CQT can also be configured to have an intra-mode CU. For example, when the CU (A5) is an intra-mode CU in the CQT including the CUs (A4) to (A7), the CU (B4) is set to an intra mode.

Further, the partition mode may be determined in step S140 so as to have the same CU size as the size changed in step S120. That is, the CU partition of the CQT of the stream basic information SM after the conversion (FIG. 6B) may be the same as the PU partition obtained as a result of the conversion (FIG. 6D).

Figure 7:
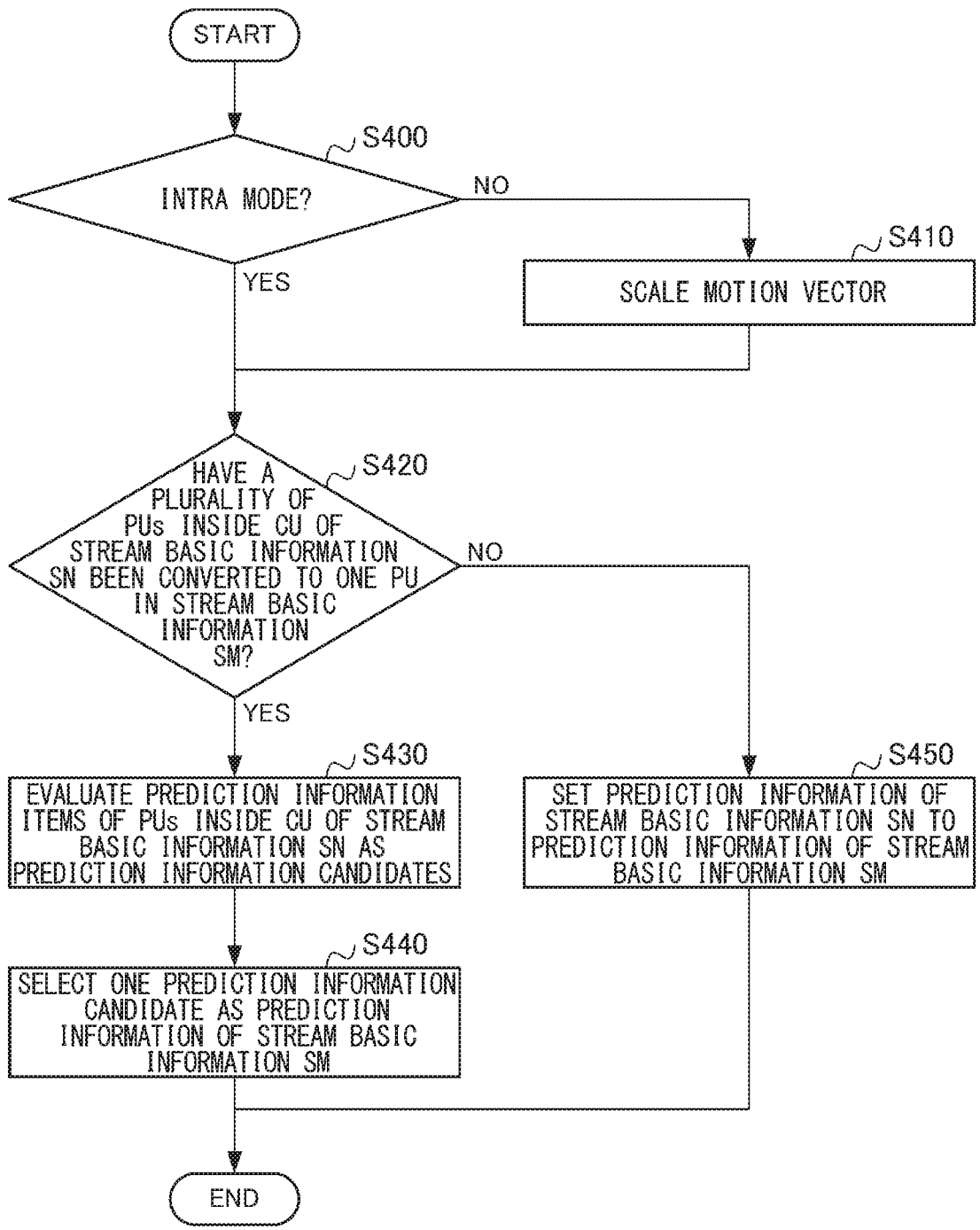
FIG. 7 is a flowchart describing a prediction information conversion process.

FIG. 7 is a flowchart describing the prediction information conversion process in step S150. Hereinbelow, the prediction information conversion will be described with reference to FIG. 7.

First, it is checked whether a prediction block is an intra-mode prediction block (S400). When the prediction block is an intra-mode prediction block (YES in S400), the process proceeds to step S420. When the prediction block is not an intra-mode prediction block (NO in S400), a motion vector is scaled according to the ratio between the picture size of the bitstream N and the picture size of the bitstream M (S410). Next, it is checked whether a plurality of PUs inside the CU of the stream basic information SN have been converted to one PU in the stream basic information SM (S420). When the PUs inside the CU of the stream basic information SN have been converted to one PU in the stream basic information SM (YES in S420), prediction information items of the PUs of the stream basic information SN are evaluated as prediction information candidates (S430), and a prediction information candidate having the highest coding efficiency is selected as prediction information of the stream basic information SM (S440). When the PUs inside the CU of the stream basic information SN have not been converted to one PU in the stream basic information SM (NO in S420), prediction information of the stream basic information SN is set to prediction information of the stream basic information SM (S450).

For example, a rate-distortion evaluation method may be used as a method for selecting the prediction information candidate having the highest coding efficiency as the prediction information. The rate-distortion evaluation method is a method for evaluating a prediction information candidate having less distortion and small bit amount using distortion and bit amount generated in coding. A prediction information evaluator which evaluates prediction information items of a plurality of PUs as prediction information candidates is installed inside the encoder 800. In this example, the prediction information evaluator is installed inside the encoder 800 in order to improve the evaluation accuracy using the rate-distortion evaluation method. However, the prediction information evaluator may be installed inside the stream basic information converter 600 in order to reduce the processing amount. Further, motion information items (the motion vector and the reference picture information referenced by the motion vector) of the prediction information candidates in a single direction may be combined with each other to generate new prediction information, and added to the prediction information candidates and evaluated. For example, when two PUs (X4) and (X5) are converted to one PU (Y4), the prediction information candidates are as shown in Table 2. In Table 2, MVL0 indicates a motion vector in an L0 direction, RefIdxL0 indicates a reference picture in the L0 direction, MVL1 indicates a motion vector in an L1 direction, and RefIdxL1 indicates a reference picture in the L1 direction.

TABLE 2

|  | L0 Direction | L1 Direction |
| --- | --- | --- |
| Prediction information candidate (X4) | MVL0 (X4), RefIdxL0 (X4) | MVL1 (X4), RefIdxL1 (X4) |
| Prediction information candidate (X5) | MVL0 (X5), RefIdxL0 (X5) | MVL1 (X5), RefIdxL1 (X5) |
| New prediction information candidate 1 | MVL0 (X4), RefIdxL0 (X4) | MVL1 (X5), RefIdxL1 (X5) |
| New prediction information candidate 2 | MVL0 (X5), RefIdxL0 (X5) | MVL1 (X4), RefIdxL1 (X4) |
| New prediction information candidate 3 | MVL0 (X4), RefIdxL0 (X4) | MVL0 (X5), RefIdxL0 (X5) |
| New prediction information candidate 4 | MVL0 (X4), RefIdxL1 (X4) | MVL1 (X5), RefIdxL1 (X5) |

Further, when the frame rate of the stream basic information SN is larger than the frame rate of the stream basic information SM, there is a possibility that reference picture information referenced by the motion vector is not present. In this case, the prediction information is scaled for conversion. In this manner, when reference picture information referenced by the motion vector is not present, the prediction information is scaled for conversion.

In this example, prediction information items of a plurality of PUs are evaluated as prediction information candidates, and the prediction information candidate having the highest coding efficiency is selected. However, for example, in order to reduce evaluation processes, prediction information of a PU having the largest area can also be used.

Further, taking into consideration the characteristics of intra-mode prediction information which is more likely to be affected by bit rate than inter-mode prediction information, change of the intra-mode prediction information may be more facilitated than change of the inter-mode prediction information when the ratio between the bit rate of the bitstream N and the bit rate of the bitstream M is larger than or equal to a predetermined value.

For example, steps may be added in the following manner. It is checked whether the prediction block is an intra-mode prediction block (S900) after step S110 or step S450. When the prediction block is an intra-mode prediction block (YES in S900), the intra-mode prediction information is changed (S910). When the prediction block is not an intra-mode prediction block (NO in S900), the process is finished.

For example, similarly, steps may be added in the following manner. When the prediction mode is not a DC mode or a PLANAR mode having no intra prediction mode specific angle information, the prediction mode is changed. When the prediction mode is a DC mode or a PLANAR mode having no intra prediction mode specific angle information, the prediction mode is not changed. The intra prediction mode specific angle information is information of an angle indicating the intra prediction direction. Further, similarly, steps may be added in the following manner. When the partition mode is N×N, the prediction mode is changed. When the partition mode is not N×N, the prediction mode is not changed. Further, similarly, steps may be added in the following manner. When a coding target block in the case where the partition mode is N×N is not neighboring with a coded block, the prediction mode is changed. When a coding target block in the case where the partition mode is N×N is neighboring with a coded neighboring block, the prediction mode is not changed.

As described above, various modes of the operation of the stream basic information conversion can be considered. Thus, a CU size conversion rule or a PU size conversion rule as the operation of the stream basic information conversion may be defined by metadata and notified to the stream basic information converter 600. It is possible to provide preferred transcoding corresponding to an application purpose by designating the operation of the stream basic information conversion by metadata in this manner.

Second Embodiment

Hereinbelow, a transcoding system according to a second embodiment will be described. The second embodiment differs from the first embodiment in the configuration and the operation of a multi-output re-encoding device and re-encoders.

Figure 8:
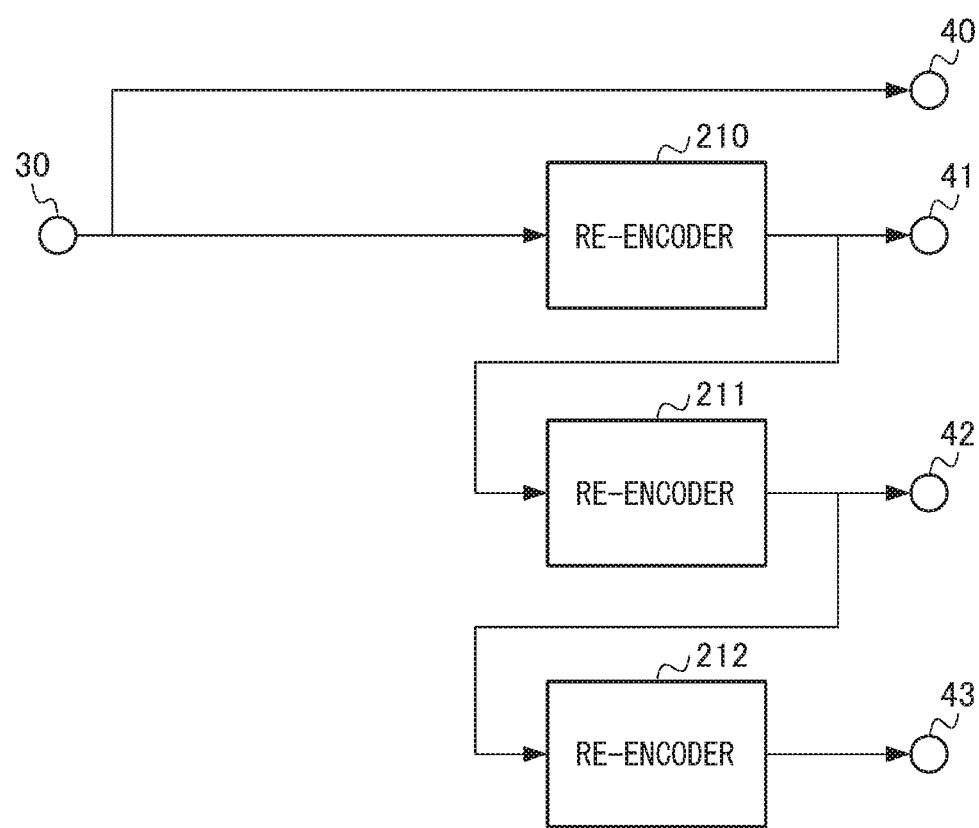
FIG. 8 is a diagram describing the configuration of a multi-output re-encoding device according to a second embodiment.

FIG. 8 is a diagram describing the configuration of a multi-output re-encoding device 2000 according to the second embodiment. The multi-output re-encoding device 2000 according to the second embodiment includes a re-encoder 210, a re-encoder 211, and a re-encoder 212. The re-encoder 210, the re-encoder 211, and the re-encoder 212 are coupled to each other via a network.

Next, an outline of the operation of the multi-output re-encoding device 2000 will be described for an operation different from that of the first embodiment.

The re-encoder 210 generates a bitstream B having a bit rate RB on the basis of information of a bitstream A input from a terminal 30, and outputs the bitstream B to a terminal 41.

The re-encoder 211 generates a bitstream C having a bit rate RC on the basis of information of the bitstream B input from the re-encoder 210, and outputs the bitstream C to a terminal 42.

The re-encoder 212 generates a bitstream D having a bit rate RD on the basis of information of the bitstream C input from the re-encoder 211, and outputs the bitstream C to a terminal 43.

Figure 9:
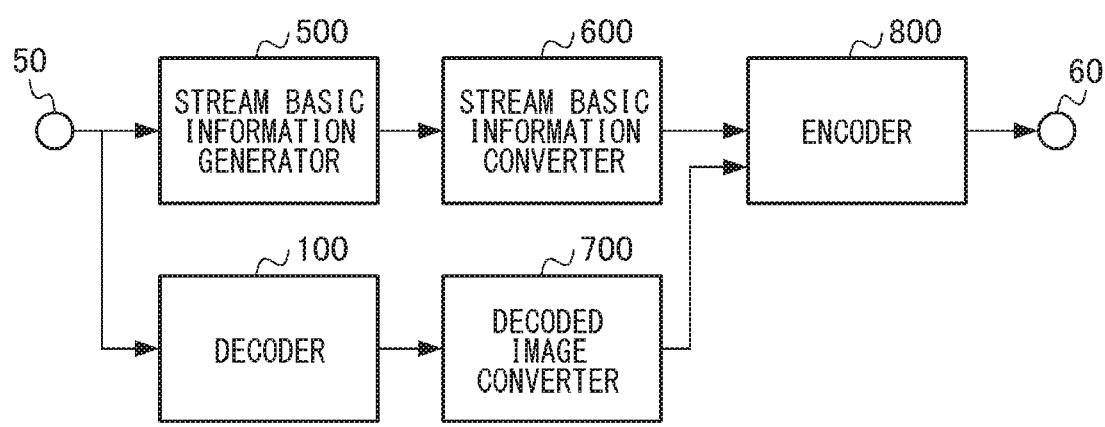
FIG. 9 is a diagram illustrating the configuration of re-encoders of FIG. 8.

FIG. 9 is a diagram describing the configuration of the re-encoders 210, 211, 212. Each of the re-encoders 210, 211, 212 includes a stream basic information generator 500, a stream basic information converter 600, a decoded picture converter 700, an encoder 800, and a decoder 100. The re-encoder 210, the re-encoder 211, and the re-encoder 212 have the same configuration.

The operations of the stream basic information generator 500, the stream basic information converter 600, and the encoder 800 are the same as those in the first embodiment.

The decoder 100 decodes a bitstream N input from a terminal 50, and outputs decoded picture IN. Note that N=A, B, or C. The decoded picture converter 700 converts the decoded picture IN input from the decoder 100 conforming to the combination of the picture size, the color difference format, and the number of bits of the bitstream M shown in Table 1 with reference to a memory (not illustrated) in which various coding conditions of the bitstream M shown in Table 1 are stored, and outputs a decoded picture IM. Note that M=B, C, or D.

In the case of the re-encoder 210, the decoder 100 decodes the bitstream A and outputs a decoded picture IA, and the decoded picture converter 700 converts the decoded picture IA conforming to the coding conditions of the bitstream B and outputs a decoded picture IB.

In the case of the re-encoder 211, the decoder 100 decodes the bitstream B and outputs a decoded picture IB, and the decoded picture converter 700 converts the decoded picture IB conforming to the coding conditions of the bitstream C and outputs a decoded picture IC.

In the case of the re-encoder 212, the decoder 100 decodes the bitstream C and outputs a decoded picture IC, and the decoded picture converter 700 converts the decoded picture IC conforming to the coding conditions of the bitstream D and outputs a decoded picture ID.

It is needless to say that the above processing relating to video coding data transcoding can be implemented as a device using hardware such as a CPU and a memory, and can also be implemented by firmware stored in a read-only memory (ROM), a flash memory, or the like or software of a computer. The firmware program and the software program can be provided by being recorded in a computer-readable recording medium, transmitted to and received from a server via a wired or wireless network, or transmitted and received as data broadcasting of ground wave or satellite digital broadcasting.

The present invention has been described above on the basis of the embodiments. It is to be understood by those skilled in the art that the embodiments are illustrative, the combination of components and processing processes can be variously modified, and such modification examples also fall within the scope of the present invention.

What is claimed is:

1. A transcoding apparatus structured to transcode one bitstream to a plurality of bitstreams, the transcoding apparatus comprising:
    a decoder structured to decode a first bitstream and output a first decoded picture;
    a first re-encoder structured to re-encode the first decoded picture on a basis of the first bitstream to generate a second bitstream having a smaller bit rate than the first bitstream; and
    a second re-encoder structured to re-encode the first decoded picture on a basis of the second bitstream and output a third bitstream having a smaller bit rate than the second bitstream,
    wherein an i-th (i=1 or 2) re-encoder includes:

a stream basic information generator structured to generate i-th stream basic information including a coding block size, prediction information and a prediction block size from an i-th bitstream;

a stream basic information converter structured to convert the i-th stream basic information to (i+1)-th stream basic information according to a ratio between a picture size of the i-th bitstream and a picture size of the (i+1)-th; and an encoder structured to encode an i-th decoded picture using the (i+1)-th stream basic information to generate a (i+1)-th bitstream, wherein the stream basic information converter sets a coding block of the (i+1)th stream basic information to an intra-mode, when the picture size of the i-th bitstream and the picture size of the (i+1)-th bitstream are different and a block size of a coding block in a coding quad tree of the i-th stream basic information is a minimum size and the number of intra mode coding blocks in the coding quad tree of the i-th stream basic information is larger than or equal to a predetermined size, wherein, when a combination of sizes of a plurality of prediction blocks inside a coding block of the i-th stream basic information is a combination of predetermined sizes, the stream basic information converter converts the prediction blocks inside the coding block of the i-th stream basic information to one prediction block in in the (i+1)-th stream basic information, and wherein, when a plurality of prediction blocks inside a coding block of the i-th stream basic information is converted to one prediction block inside a coding block of the (i+1)-th stream basic information and the one prediction block inside the coding block of the (i+1)-th stream basic information is an intra mode, the stream basic information converter changes the intra-mode prediction information.

2. A transcoding apparatus structured to transcode one bitstream to a plurality of bitstreams, the transcoding apparatus comprising:

a decoder structured to decode a first bitstream and output a first decoded picture;

a first re-encoder structured to re-encode the first decoded picture on a basis of the first bitstream to generate a second bitstream having a smaller bit rate than the first bitstream, wherein
the decoder decodes the second bitstream and outputs a second decoded picture, and
the transcoding apparatus further comprises a second re-encoder structured to re-encode the second decoded picture on a basis of the second bitstream and output a third bitstream having a smaller bit rate than the second bitstream, wherein an i-th (i=1 or 2) re-encoder includes:
a stream basic information generator structured to generate i-th stream basic information including a coding block size, prediction information and a prediction block size from an i-th bitstream;

a stream basic information converter structured to convert the i-th stream basic information to (i+1)-th stream basic information according to a ratio between a picture size of the i-th bitstream and a picture size of the (i+1)-th bitstream; and an encoder structured to encode an i-th decoded picture using the (i+1)-th stream basic information to generate a (i+1)-th bitstream, wherein the stream basic information converter sets a coding block of the (i+1)-th stream basic information to an intra-mode, when the picture size of the i-th bitstream and the picture size of the (i+1)-th bitstream are different and a block size of a coding block in a coding quad tree of the i-th stream basic information is a minimum size and the number of intra mode coding blocks in the coding quad tree of the i-th stream basic information is larger than or equal to a predetermined size, wherein, when a combination of sizes of a plurality of prediction blocks inside a coding block of the i-th stream basic information is a combination of predetermined sizes, the stream basic information converter converts the prediction blocks inside the coding block of the i-th stream basic information to one prediction block in in the (i+1)-th stream basic information, and wherein, when a plurality of prediction blocks inside a coding block of the i-th stream basic information is converted to one prediction block inside a coding block of the (i+1)-th stream basic information and the one prediction block inside the coding block of the (i+1)-th stream basic information is an intra mode, the stream basic information converter changes the intra-mode prediction information.

3. The transcoding apparatus according to claim 1, wherein, when a size of each coding block after block partition in the i-th stream basic information is smaller than or equal to a predetermined size, the stream basic information converter converts a plurality of coding blocks continuous, in an order of coding, with a coding block having the coding block size smaller than or equal to the predetermined size in the i-th stream basic information to one coding block in the (i+1)-th stream basic information.

4. The transcoding apparatus according to claim 1, wherein, when the number of partitioned prediction blocks inside a coding quad tree of the i-th stream basic information is larger than or equal to a predetermined number, the stream basic information converter sets a coding block of the (i+1)-th stream basic information to an intra mode.

5. A transcoding method for transcoding one bitstream to a plurality of bitstreams, the method comprising:
a decoding step of decoding a first bitstream and outputting a first decoded picture;
a first re-encoding step of re-encoding the first decoded picture on the basis of the first bitstream to generate a second bitstream having a smaller bit rate than the first bitstream; and
a second re-encoding step of re-encoding the first decoded picture on a basis of the second bitstream and output a third bitstream having a smaller bit rate than the second bitstream,
wherein an i-th (i=1 or 2) re-encoder step includes:
a stream basic information generating step of generating i-th stream basic information including a coding block size, prediction information and a prediction block size from an i-th bitstream;
a stream basic information converting step of converting the i-th stream basic information to (i+1)-th stream basic information according to a ratio between a picture size of the i-th bitstream and a picture size of the (i+1)-th bitstream; and
an encoding step of encoding an i-th decoded picture using the (i+1)-th stream basic information to generate a (i+1)-th bitstream,
wherein the stream basic information converting step sets a coding block of the (i+1)-th stream basic information to an intra-mode, when the picture size of the i-th bitstream and the picture size of the (i+1)-th bitstream are different and a block size of a coding block in a coding quad tree of the i-th stream basic information is a minimum size and the number of intra mode coding blocks in the coding quad tree of the i-th stream basic information is larger than or equal to a predetermined size, wherein, when a combination of sizes of a plurality of prediction blocks inside a coding block of the i-th stream basic information is a combination of predetermined sizes, the stream basic information converting step converts the prediction blocks inside the coding block of the i-th stream basic information to one prediction block in in the (i+1)-th stream basic information, and wherein, when a plurality of prediction blocks inside a coding block of the i-th stream basic information is converted to one prediction block inside a coding block of the (i+1)-th stream basic information and the one prediction block inside the coding block of the (i+1)-th stream basic information is an intra mode, the stream basic information converting step changes the intra-mode prediction information.

6. A non-transitory computer-readable medium storing executable instructions that, in response to execution, cause a computer to perform operations comprising:

a decoding step of decoding a first bitstream and outputting a first decoded picture;

a first re-encoding step of re-encoding the first decoded picture on a basis of the first bitstream to generate a second bitstream having a smaller bit rate than the first bitstream; and a second re-encoding step of re-encoding the first decoded picture on a basis of the second bitstream and output a third bitstream having a smaller bit rate than the second bitstream, wherein an i-th (i=1 or 2) re-encoder step includes:

a stream basic information generating step of generating i-th stream basic information including a coding block size, and prediction information and a prediction block size from an i-th bitstream;

a stream basic information converting step of converting the i-th stream basic information to (i+1)-th stream basic information according to a ratio between a picture size of the i-th bitstream and a picture size of the (i+1)-th bitstream; and an encoding step of encoding an i-th decoded picture using the (i+1)-th stream basic information to generate a (i+1)-th bitstream, wherein the stream basic information converting step sets a coding block of the (i+1)-th stream basic information to an intra-mode, when the picture size of the i-th bitstream and the picture size of the (i+1)-th bitstream are different and a block size of a coding block in a coding quad tree of the i-th stream basic information is a minimum size and the number of intra mode coding blocks in the coding quad tree of the i-th stream basic information is larger than or equal to a predetermined size, and wherein, when a combination of sizes of a plurality of prediction blocks inside a coding block of the i-th stream basic information is a combination of predetermined sizes, the stream basic information converting step converts the prediction blocks inside the coding block of the i-th stream basic information to one prediction block in in the (i+1)-th stream basic information, and wherein, when a plurality of prediction blocks inside a coding block of the i-th stream basic information is converted to one prediction block inside a coding block of the (i+1)-th stream basic information and the one prediction block inside the coding block of the (i+1)-th stream basic information is an intra mode, the stream basic information converting step changes the intra-mode prediction information.

7. The transcoding apparatus according to claim 1, wherein when a partition mode of a coding block having a coding block size smaller than or equal to a predetermined size in the i-th stream basic information is a predetermined partition mode, the stream basic information converter converts a partition mode of a coding block in the (i+1)-th stream basic information to a partition mode which differs from the partition mode of the coding block having the coding block size smaller than or equal to the predetermined size in the i-th stream basic information and has the same partition direction.

* * * * *